United States Patent [19]

Reddy

[11] 4,116,545
[45] Sep. 26, 1978

[54] POLYMERIC ELECTROLYTE FOR ELECTROCHROMIC DISPLAY DEVICES

[75] Inventor: Thomas Bradley Reddy, Pound Ridge, N.Y.

[73] Assignee: American Cyanamid Company, Stamford, Conn.

[21] Appl. No.: 735,939

[22] Filed: Oct. 27, 1976

[51] Int. Cl.$^2$ .............................................. G02F 1/17
[52] U.S. Cl. ..................................... 350/357; 252/408
[58] Field of Search ..................... 260/2.2 R; 252/500, 252/408; 350/160 R, 160 P

[56] References Cited

U.S. PATENT DOCUMENTS

| | | | |
|---|---|---|---|
| 2,527,300 | 10/1950 | Dudley | 260/2.2 R |
| 2,898,311 | 8/1959 | Tsunoda et al. | 260/2.2 R |
| 3,320,218 | 5/1967 | Levine | 260/2.2 R |
| 3,453,038 | 7/1969 | Kissa et al. | 350/357 |
| 3,510,418 | 5/1970 | Mizutani et al. | 260/2.2 R |
| 3,546,142 | 12/1970 | Michaels et al. | 260/2.2 R |
| 3,629,082 | 12/1971 | Gaidara et al. | 260/2.2 R |
| 3,704,057 | 11/1972 | Beegle | 350/160 R |
| 3,708,220 | 1/1973 | Meyers et al. | 350/160 R |
| 3,819,252 | 6/1974 | Giglia | 350/160 R |
| 3,840,288 | 10/1974 | Schnatterly | 350/357 |
| 3,892,472 | 7/1975 | Giglia | 350/357 |
| 3,957,352 | 5/1976 | Leibowitz | 350/357 |
| 3,970,365 | 7/1976 | Giglia | 350/160 R |

FOREIGN PATENT DOCUMENTS 2,603,200   8/1976   Fed. Rep. of Germany ...... 350/160 R

*Primary Examiner*—Benjamin R. Padgett
*Assistant Examiner*—T. S. Gron
*Attorney, Agent, or Firm*—Robert J. Feltovic; Gordon L. Hart

[57] ABSTRACT

Disclosed is an electrochromic variable light modulating device including an improved ion conducting layer. The ion conductor comprises a polymeric composition containing polyethylene sulfonic acid, a pigment and water.

3 Claims, No Drawings

POLYMERIC ELECTROLYTE FOR ELECTROCHROMIC DISPLAY DEVICES

The invention relates to electro-optical devices whose electromagnetic radiation absorption characteristics can be selectively altered by the influence of a suitably controlled electric field. More particularly, the invention relates to variable light modulating devices which include a light transmitting substrate with a layer of persistent electrochromic material as a light modulator and a counterelectrode separated from the electrochromic layer by an ion conducting material. In specific, the invention is directed to an improved ion conducting material for electrochromic devices and a method for forming such an ion conductor.

Electrochromic devices are known in the art and are exemplified by prior, commonly assigned, U.S. patents, such as U.S. Pat. Nos. 3,704,057, 3,708,220, 3,819,252 and 3,970,365. These patents describe suitable materials and methods for forming the overall electrochromic device of the present invention. The device preferably is formed in a sandwich arrangement of a substrate, an electrochromic material, an ion-conducting medium and a counter-electrode. The light transmitting substrate includes a coating of a conductive material, such as tin oxide. This substrate may be conveniently provided as a unit by commercially available NESA ® glass, which is a product having a transparent coating of tin oxide on one surface of a glass sheet. The electrochromic material may be deposited on the tin oxide layer by known vacuum deposition techniques. Further these patents serve to illustrate various ion-conducting materials which previously have been utilized. In U.S. Pat. No. 3,704,057, use of a liquid acid electrolyte is shown; U.S. Pat. No. 3,708,220 introduces a semi-solid conductive electrolyte gel. In an effort to improve cell life, U.S. Pat. Nos. 3,819,252 and 3,970,365 teach to incorporate selected additives into a solid ion-conductive gel. In addition commonly assigned, copending U.S. patent application Ser. No. 735,940 entitled Ion Exchange-Electrolyte Layer for Electrochromic Devices, filed Oct. 27, 1976 in the name of Giglia et al, describes use of an ion-exchange membrane wetted with an electrolyte, as an ion conductive medium.

Although prior ion conducting media have been effective in successfully operated electrochromic devices, the achievement of long cell life continues as a sought-after goal. The present ion exchange medium is designed to provide an electrochromic device with an improved cell life. Electrochromic devices, such as those disclosed in the cited patents, having substantial amounts of liquid acid electrolyte present are known to have limited cell life due to a slow process involving dissolution of the electrochromic film layer and the tin oxide layer of the substrate. The above-cited, commonly assigned, copending U.S. patent application, filed concurrently herewith, seeks to minimize this erosion process, by providing for the use of only a very small amount of free electrolyte in combination with a membrane of ion exchange material. This ion exchange membrane has a high conductivity to protons, so as to permit effective ionic conductance, while the minimal free electrolyte provides good switching speed by establishing inter-facial contact between polymer layer and electrode surfaces and by enhancing ion conductivity.

However, while solid ion exchange membranes serve as adequate ion conductors, the use of a solid layer introduces the problem of ensuring good electrical contact between the counter-electrode, the electrochromic electrode and the ion conducting material. An approach to resolve this problem of electrical contact is to introduce a small amount of liquid electrolyte to the ion exchange membrane. Such an arrangement has met with success in achieving contact; but presence of the liquid electrolyte, even in minimal amounts, eventually contributes to the dissolution and degradation of the electrochromic layer.

The present invention is directed to the use of a viscoelastic polymer composition as an ion-conducting material. The viscoelastic properties of the ion-conductor serve to provide an intimate electrical contact when it is pressed between the two electrode surfaces. Elimination of the liquid electrolyte also results in enhanced cell lifetime by removing a suspected cause of erosion.

The viscoelastic organic polymer composition can be prepared by dissolving the sodium salt of polyethylene sulfonic acid in water and passing this solution through a strong-acid ion exchange column. An ion exchanger commercially available as Amberlite ® IR-120 has been found to be suitable for this procedure. Passing the sodium salt through this ion exchange column serves to convert it to the free sulfonic acid. It generally is preferable to provide background coloration for the electrochromic cell in order to have a contrasting surface against which an electrochromic display can be readily viewed. Accordingly, the free sulfonic acid solution can be mixed with a suitable pigment and then dehydrated to produce a composition containing polyethylene sulfonic acid, pigment and water. This composition is stable, is viscoelastic, and provides good conductivity and also good electrical contact between the electrodes of an electrochromic display device.

The following examples illustrate preferred embodiments of the invention:

PREPARATION OF POLYMERIC ELECTROLYTE

EXAMPLE I 3.5005 grams of sodium poly(ethylene sulfonate) was dissolved in 350 ml of distilled water. This solution was passed slowly through a strong acid ion-exchange column (Amerlite ® IR-120) thereby converting the sodium salt to poly(ethylene sulfonic acid). To provide coloration a yellow pigment (Sun Yellow C) was added to the solution. The pigment was added by first mulling the pigment with a small amount of the polymer solution and then quantitatively transfering the mull to the main solution. The resulting slurry then was dehydrated in a flash evaporator at 45° C. Water was removed to form an elastomeric material with a water content of 16.6% and a pigment concentration of 7.6% of the total weight.

EXAMPLE II

A solution of sodium poly(ethylene sulfonate) at a concentration of 1 gram per 100 ml of $H_2O$ was passed through a strong acid ion-exchange column and colored by yellow pigment as in Example I. The pigmented polymer slurry was dehydrated at 45° C. until the water content was 15.7% and the pigment concentration was 12.6% of the total weight. The resultant product was of an elastomeric consistency.

ASSEMBLY OF AN EC DEVICE WITH POLYMERIC ELECTROLYTE

EXAMPLE III

A portion of the viscoelastic pasty product of Example I [poly(ethylene sulfonic acid)] was taken and pressed between two electrode plates.

One of the electrodes consisted of a glass substrate with a layer of conductive $SnO_2$ thereon (commercially available as a unit under the name NESA ® glass) and with a layer of an evaporated amorphous film of tungsten oxide coated over the $SnO_2$. The tungsten oxide was deposited on the NESA glass in the form of a figure 8 with a thickness of 3600A. A deposit of 2400A thick $SiO_2$ was used to cover the $SnO_2$ film in areas not covered by the tungsten oxide. The second electrode consisted of a paper electrode comprising a web of filament permeated with carbon of the type described in commonly assigned, copending U.S. patent application Ser. No. 690,446 filed May 27, 1976. The paper electrode was compression bonded to a layer of NESA glass.

The assembled layered device was sealed with an epoxy adhesive. The paper counter-electrode was made positive and the electrode with the tungsten oxide was made negative, and a current of 250 microamperes passed for 0.9 second. The tungsten oxide colored blue and displayed digital display information. To erase, the polarity was reversed and a current of 270 microamperes passed for 0.9 second. A test group of four such devices was cycled (colored and erased) for four million cycles with no failures.

EXAMPLE IV

An electrochromic display device was assembled as described in Example III using, however, the viscoelastic electrolyte material of Example II. The assembled device was colored by passing a current of 320 microamperes for 0.9 second. Bleaching was accomplished by passing a current of 340 microamperes for 0.9 second. Such a device was cycled for 2.9 million cycles before failure.

In applications where higher ion conductivity may be required, the invention also can be used in the form of viscoelastic compositions obtained by adding a low molecular weight acid, such as sulfuric acid, to the mixture of poly(ethylene sulfonic acid), pigment and water. Various other embodiments also may offer advantages in particular applications. Copolymers of ethylene sulfonic acid can be prepared by blending the ethylene sulfonic acid with other monomers such as acrylamide, acrylic acid, methacrylic acid, maleic acid, N-vinyl pyrolidone, vinyl acetate and styrene before polymerization.

I claim:

1. In an electrochromic variable light modulating device having an arrangement comprising a light transmitting substrate with a persistent electrochromic material as a light modulator and a counter-electrode separated from said substrate by an ion conducting material, an improved ion conducting material comprising an aqueous solution of polyethylene sulfonic acid which has been dehydrated to viscoelastic consistency.

2. The electrochromic device of claim 1 wherein the ion conducting material further includes a pigment.

3. The electrochromic device of claim 2 wherein the ion conducting material further comprises a low molecular weight acid.

* * * * *